United States Patent [19]
Watanabe

[11] Patent Number: 5,973,668
[45] Date of Patent: Oct. 26, 1999

[54] POINTING DEVICE

[75] Inventor: Nobuaki Watanabe, Tokyo, Japan

[73] Assignee: Oki Electric Industry Co., Ltd., Tokyo, Japan

[21] Appl. No.: 08/678,859

[22] Filed: Jul. 12, 1996

[30] Foreign Application Priority Data

Jul. 21, 1995 [JP] Japan .................................. 7-185264

[51] Int. Cl.⁶ ............................................... G09G 5/500
[52] U.S. Cl. .......................... 345/157; 345/145; 345/156; 345/159; 345/161
[58] Field of Search .................................. 345/145, 156, 345/157, 158, 159, 160, 161, 163

[56] References Cited

U.S. PATENT DOCUMENTS

| | | | |
|---|---|---|---|
| 4,725,978 | 2/1988 | Fujioka | 364/900 |
| 5,432,530 | 7/1995 | Arita et al. | 345/159 |
| 5,453,758 | 9/1995 | Sato | 345/158 |
| 5,477,237 | 12/1995 | Parks | 345/156 |
| 5,488,204 | 1/1996 | Mead et al. | 178/18 |
| 5,528,260 | 6/1996 | Kent | 345/123 |

FOREIGN PATENT DOCUMENTS

| | | |
|---|---|---|
| 92/09982 | 6/1992 | European Pat. Off. . |
| 4-148833 | 5/1992 | Japan . |

*Primary Examiner*—Mark R. Powell
*Assistant Examiner*—Vincent E. Kovalick
*Attorney, Agent, or Firm*—Rabin, Champagne, & Lynt, P.C.

[57] ABSTRACT

In the pointing device of the present invention, a sensor is connected via an amplifier section to a microcomputer. Further, a reference voltage generator is connected to the microcomputer and the amplifier section. With this construction, the microcomputer modifies a coefficient, used when calculating a reference voltage for determining a cursor speed, in response to the size of a force applied to the sensor by an operator.

8 Claims, 9 Drawing Sheets

POINTING DEVICE

BACKGROUND OF THE INVENTION

1. Field of the Invention

The present invention relates to a pointing device for controlling the movement of a cursor displayed on a display device.

2. Description of the Related Art

Pointing devices are used in an appliance such as a personal computer, a work station, etc., for controlling the movement of a cursor displayed on a display device in response to an operator changing the position of a stick provided on an outer surface of the appliance. Such a pointing device is used in a force detecting device as disclosed, for example, in Japanese patent laid open No. Hei-4-148833. This force detection device is provided with a sensor for detecting respective changes in an operating load in an X direction and a Y direction resulting from an operator's action, a converter for converting the detected change amounts into voltages, and an amplifier section for amplifying the converted voltages.

However, in this prior art pointing device, the cursor speed is determined in response to the size of a load applied to the sensor by an operator, using a reference voltage calculated using a fixed coefficient. Accordingly, when the coefficient is initialized with emphasis on the case when the operating load is large, the cursor speed is too fast, and it is difficult to stop the cursor at a desired position on the screen. Conversely, when the coefficient is initialized with emphasis on the case when the operating load is small, it takes a long time to move the cursor to a position which is far away.

Also, with this prior art pointing device, an offset voltage which becomes a value for detecting the change in the operating load voltage is initialized immediately after start-up of the control device. However, it is assumed that the load applied to the sensor is zero immediately after start-up of the control device, but in actual fact there is a situation where a slight load is being applied to the sensor. For example, if some sort of load due to the operator's unconscious touch on the stick, etc., is being applied to the sensor when the offset voltage is initialized, an inappropriate offset voltage is initialized. If the offset voltage is initialized to an inappropriate value in this way, a situation arises where the cursor does not move if a very weak load is applied to the sensor when the operator intends to move the cursor at a slow speed.

Another problem with this prior art pointing device is that an offset voltage that is initialized immediately after start-up of the above mentioned control device gradually changes during operation of the appliance, due to changes in circuit characteristics caused by environmental temperature variations. If the offset voltage changes in this way, the ratio of operating load to cursor speed is not uniform in the X direction and Y direction, and a situation arises where the cursor moves even when the sensor is in a non-operating state.

SUMMARY OF THE INVENTION

An object of the present invention is to provide a pointing device which can be used for excellent cursor movement. Another object of the present invention is to move the cursor at a speed which is touch-sensitive to a load applied to a sensor by an operator, and to prevent cursor movement when the sensor is in a non-operating state.

In order to achieve the above mentioned objects, the pointing device of the present invention comprises a sensor for detecting respective components of an applied external force in the X direction and Y direction, converting the components to signals and outputting them, an amplifier section for respectively amplifying outputs from the sensor, a reference voltage generator, and a microcomputer for modifying a coefficient, used when a reference voltage for determining a cursor speed is calculated, in response to the size of an output from the amplifier section.

The pointing device having the above-described construction modifies a coefficient, used when a reference voltage for determining the cursor speed is calculated, in response to the size of a load applied to the sensor by an operator. As a result, it is possible to move the cursor at a speed that is more touch sensitive to the load applied by an operator, than when the reference voltage for determining the cursor speed is calculated using a fixed coefficient.

The microcomputer comprises an initial offset voltage stabilizer for adjusting offset voltages of the X and Y directions after the pointing device has been started up, and monitoring and adjusting the offset voltages for a fixed period of time from start-up.

In the pointing device having the above-described construction, the initial offset voltage stabilizer adjusts offset voltages of the X and Y directions after the pointing device has been started up, and monitors the offset voltage for a fixed period from start-up and carries out adjustment. Accordingly, even when an inappropriate offset voltage is initialized due to some load being applied to the sensor when the offset voltage is initialized, the offset voltage is monitored for a fixed time and suitably adjusted. This means that when the operator applies a very weak load to the sensor so as to move the cursor at a slow speed, the cursor moves at a low speed which is touch sensitive to that load.

The microcomputer further comprises an offset adjuster for monitoring and adjusting the offset voltage every fixed time while the pointing device is operating.

In the pointing device having the above-described construction, the offset adjuster monitors the offset voltage every fixed time during operation of the pointing device, and carries out adjustment when the offset voltage changes due to changes in circuit conditions caused by variations in temperature of the environment. Accordingly, the ratio of operating load to cursor speed is constantly uniform in the X direction and Y direction, and movement of the cursor does not occur when the sensor is in a non-operating state.

DESCRIPTION OF THE PREFERRED EMBODIMENTS

Figure 1:
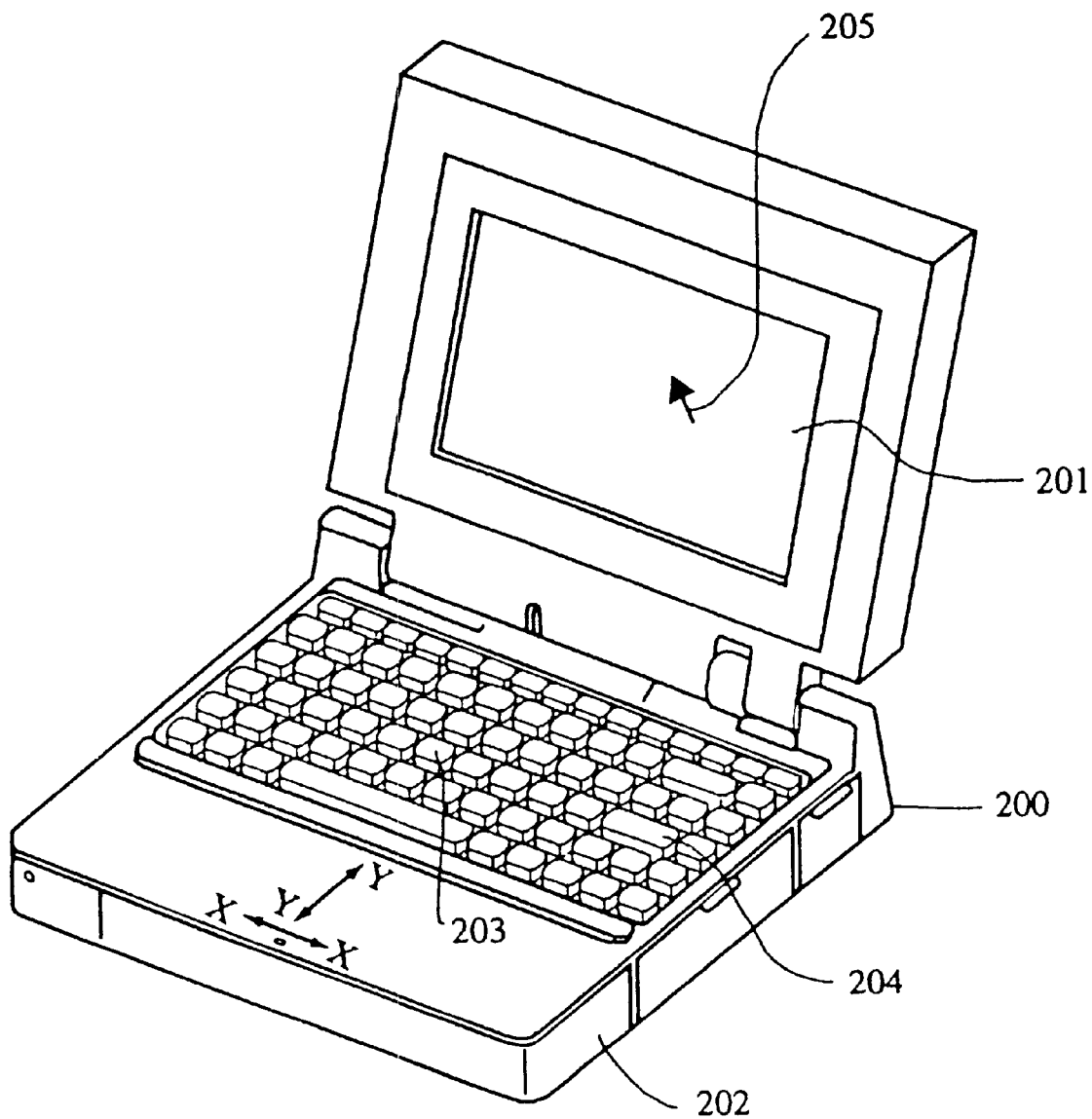
FIG. 1 is an external perspective view of a personal computer.

Preferred embodiments of the present invention will be described below with reference to the drawings. In each of the drawings, the same reference numerals will be assigned to common components.

Figure 2:
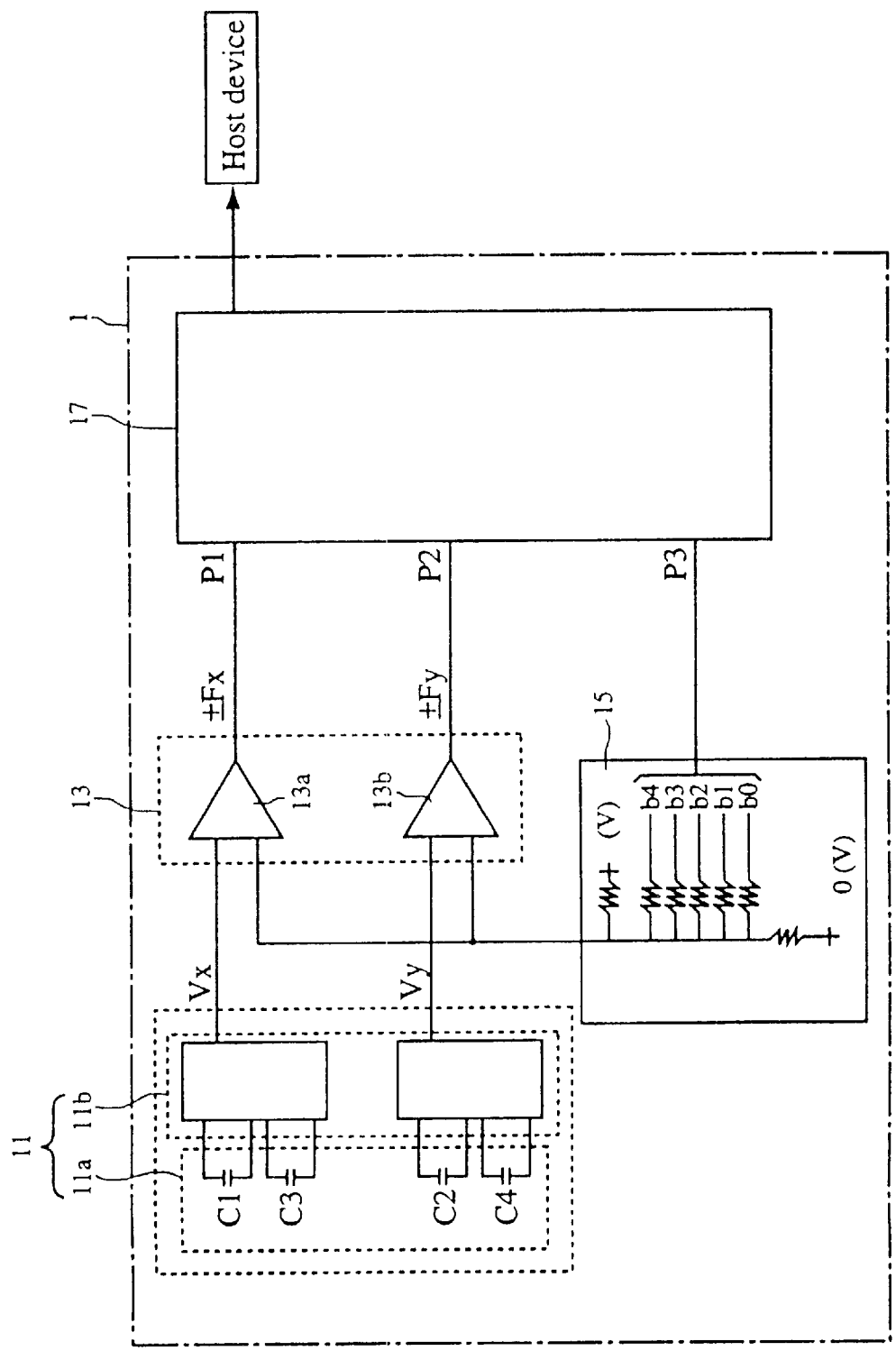
FIG. 2 is a control block diagram of a pointing device.
Figure 3:
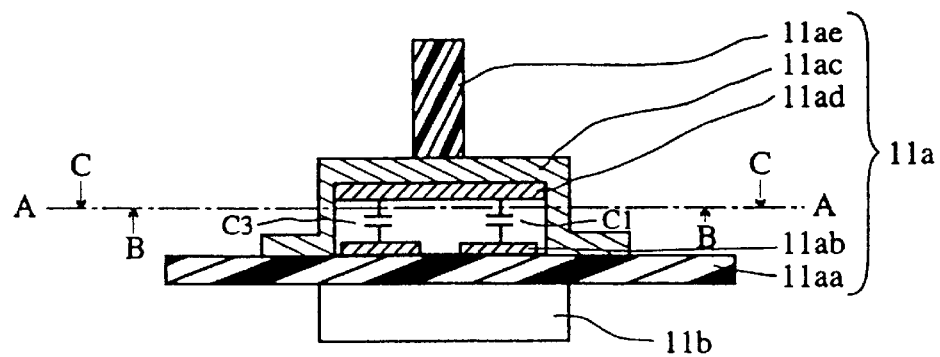
FIG. 3 is a cross-sectional view of a sensor.
Figure 4:
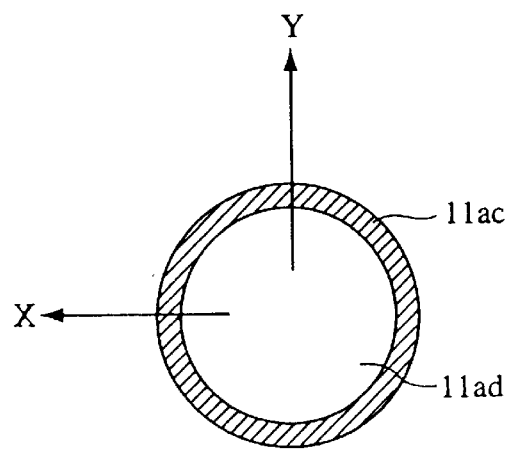
FIG. 4 is a cross-sectional view along section A—A of FIG. 3, looking from the direction of arrow B.
Figure 5:
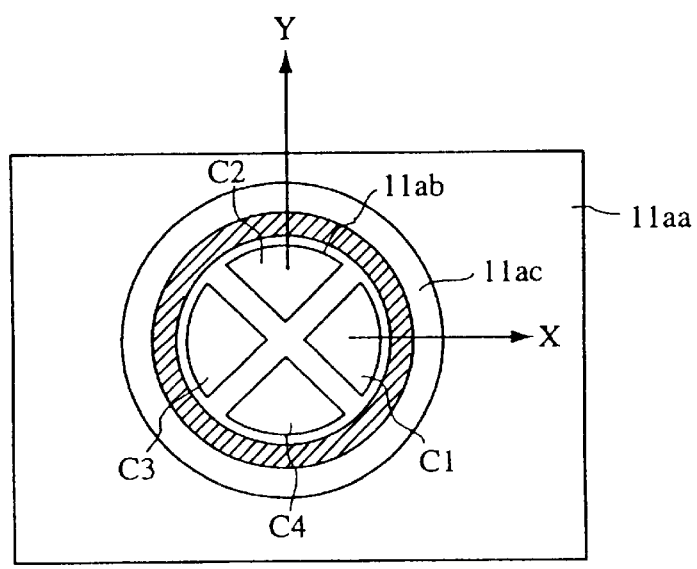
FIG. 5 is a cross-sectional view along section A—A of FIG. 3, looking from the direction of arrow C.
Figure 6:
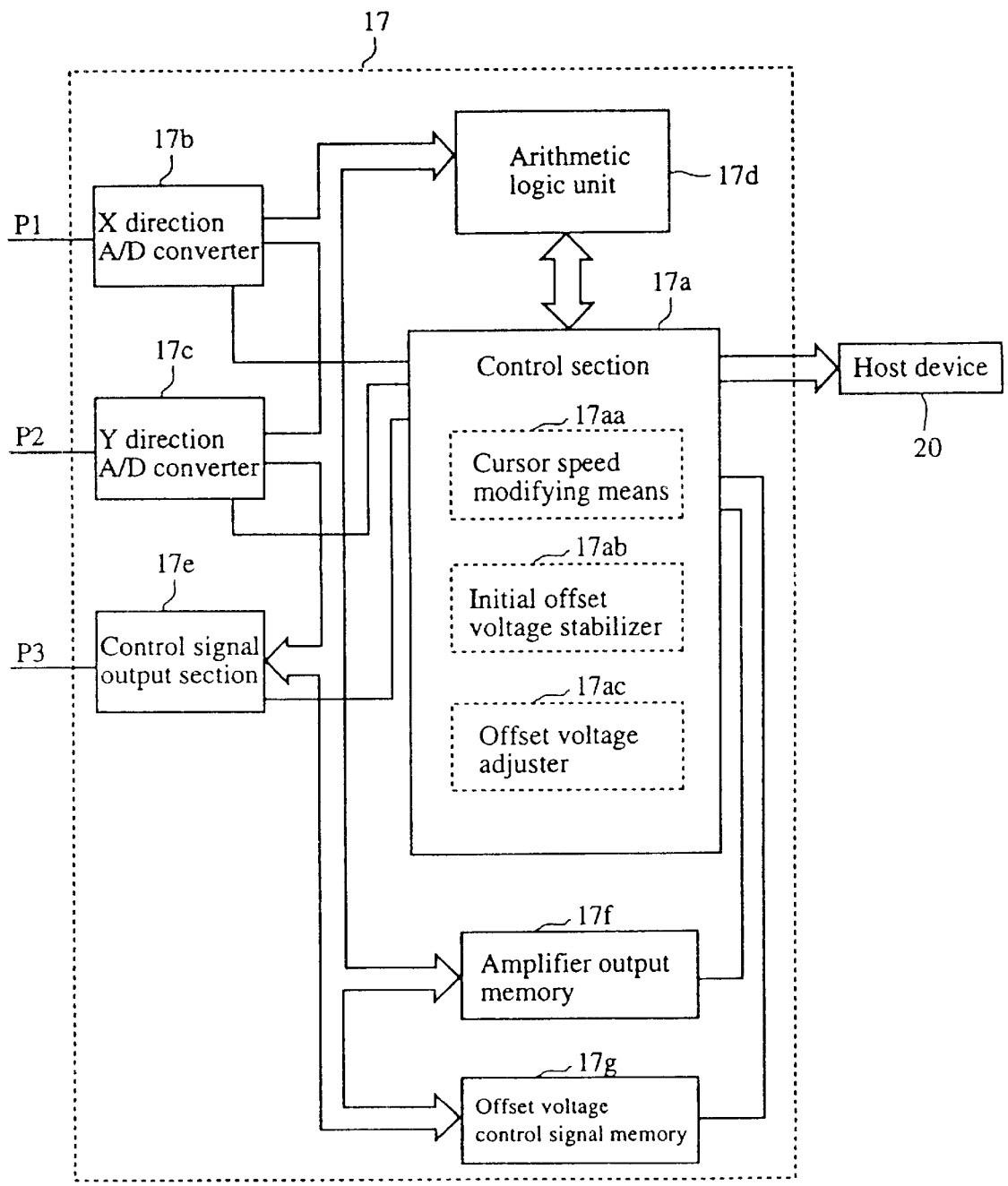
FIG. 6 is a control block diagram of a microcomputer.

FIG. 1 is an external perspective view of a personal computer; FIG. 2 is a control block diagram of a pointing device; FIG. 3 is a cross-sectional view of a sensor; FIG. 4 is a cross-sectional view along section A—A of FIG. 3, looking from the direction of arrow B; FIG. 5 is a cross-sectional view along section A—A of FIG. 3, looking from direction of arrow C; and FIG. 6 is a control block diagram of a micro computer. In FIG. 1, a personal computer 200 is comprised of a display section 201 and a main body 202.

In the main body 202 a stick 203 projects from between a plurality of key switches 204. An operator presses against an upper surface of the stick 203 with a finger, and a cursor 205 displayed on the display section 201 is moved in a direction corresponding to a direction of motion of the stick 203, depending on how hard it is pushed in the direction of arrow X—X or the direction of arrow Y—Y. A host device is provided inside the personal computer 200, for controlling the whole appliance. The pointing device in FIG. 2 comprises a sensor 11, an amplifier 13, a reference voltage generator 15, and a microcomputer 17. The microcomputer 17 shown in FIG. 6 includes a control section 17a, and the control section 17a comprises a cursor speed modifying means 17aa, an initial offset voltage stabilizer 17ab and an offset voltage adjuster 17ac. The technology disclosed in, for example, Patent Laid Open No. Hei-4-148833 is utilized as the sensor 11. As a further example, device μPc324 is used as the amplifier section 13, and device HD404344 is used as the microcomputer 17.

First of all, the sensor 11 will be described. The sensor 11 in FIG. 3 comprises an external force detection section 11a, and a signal conversion section 11b. The sensor 11 detects an applied external force in a two directions, namely respective components in an X direction and a Y direction, from a motion caused by the operator pressing the operation section 11ae corresponding to the stick 203 in FIG. 1. The external force detection section 11a detects changes in external force for respective X direction and Y direction operating loads applied by an operator, and the signal conversion section 11b converts signals detected by the external force detection section 11a into voltages.

The external force detection section 11a shown in FIG. 3, FIG. 4 and FIG. 5 comprises a printed circuit board 11aa, individual electrodes 11ab, a position sensitive sleeve 11ac, a common electrode 11ad, and the operation section 11ae corresponding to the stick 203 of FIG. 1. The horizontal surface of the fixed substrate 11aa is divided into four parts, and four individual electrodes 11ab are arranged on upper portions corresponding to each of the divided areas. The position sensitive sleeve 11ac is made of a flexible piece of thin stainless steel etc., and is warped by the external force. The position sensitive sleeve 11ac covers over the four individual electrodes 11ab to maintain an empty space, and the end portions are fixed to the fixed substrate 11aa. The common electrode 11ad is positioned on the rear surface of the position sensitive sleeve 11ac opposite to the individual electrodes 11ab. The operation section 11ae is fixed to the rear surface of the position sensitive sleeve 11ac, and its motion warps the position sensitive sleeve 11ac by transmitting an external force from the operator.

In this type of external force detecting section 11a, static electricity is generated on upper surfaces of each of the four individual electrodes 11ab opposed to the common electrode 11ad, and the electrostatic capacity of each of the individual electrodes 11ab is represented by C1–C4. When the distance between the common electrode 11ad and each of the individual electrodes 11ab changes due to warping of the position sensitive sleeve 11ac as a result of an external force being applied to the operation section 11ae, the four electrostatic capacities C1–C4 also change in response. The external force detecting section 11a apportions two of the four electrostatic capacities C1–C4 for ±X direction detection and the other two for ±Y direction detection, and respectively detects changes in electrostatic capacity in the X direction and Y direction for an external force applied to the operation section 11ae. The signal conversion section 11b is provided on the concealed surface of the fixed substrate 11aa, and converts changes in electrostatic capacities C1–C4 detected by the external force detection section 11a into voltages. A cross section of the signal conversion section 11b is not shown in FIG. 3.

As shown in FIG. 2, the amplifier section 13 comprises a first amplifier 13a and a second amplifier 13b, and respectively amplifies outputs for X and Y directions from the sensor 11. The first amplifier 13a amplifies a signal Vx (V) output from the sensor 11 when an external force of the ±X direction is applied to the operation section 11ae of the sensor 11. The second amplifier 13b amplifies a signal Vy (V) output from the sensor 11 when an external force of the ±Y direction applied to the operation section 11ae of the sensor 11 is in the ±Y direction. The output ±Fx (V) of the first amplifier 13a is input to the I/O port P1 connecting to the X direction A/D converter 17b provided in the microcomputer 17 in FIG. 6. On the other hand, output ±Fy (V) of the second amplifier 13b is input to the I/O port P2 connecting to the Y direction A/D converter 17c provided in the microcomputer 17.

The offset voltage which is the value of the output ±Fx (V) of the first amplifier 13a and the output ±Fy (V) of the second amplifier 13b when no external force causing the cursor to move is applied to the operation section 11ae of the sensor 11 are adjusted to 2 (V) using a reference voltage input from the reference voltage generator 15. The reference voltage generator 15 is formed of a resistor array, and receives as inputs offset voltage control signals from the control signal output section 17e provided in the microcomputer 17, via I/O port P3. The offset control signal are made up of b0–b4, and these are varied from (0,0,0,0,0) to (1,1,1,1,1). The reference voltage generating section 15 generates one of 32 reference voltages using these offset voltage control signals, and outputs it to the first amplifier 13a and the second amplifier 13b.

The microcomputer 17 shown in FIG. 6 comprises the control section 17a, X direction A/D conversion section 17b, Y direction A/D converter 17c, and control signal output section 17e mentioned above, as well as an arithmetic logic unit 17d, amplifier output memory 17f, and offset voltage control signal memory 17g. Each of the A/D converters 17b, 17c, and each of the memory sections 17f, 17g, can be formed independently of the microcomputer 17. The control section 17a carries out control, using an offset voltage control signal, so that the reference voltage generating section 15 generates a reference voltage for making the offset voltages of the first amplifier 13a and the second amplifier 13b a specified voltage, 2 (v) in this example. When the output values from the amplifier section 13 are different from the offset voltages, or when the difference between output values and the offset voltages is outside a prescribed permitted range, the control section 17a also calculates a reference voltage for determining a cursor speed in response to the size of the output value, using the arithmetic logic unit 17d, and outputs the reference voltage to a host device 20.

The cursor speed modifying means 17aa modifies a coefficient used when calculating the reference voltage for determining the cursor speed, in response to the size of an output from the amplifier section 13. The initial offset voltage stabilizer 17ab adjusts the X and Y direction offset voltages after start-up of the pointing device, and carries out monitoring and adjustment of the offset voltage for a specified time from start-up. The offset voltage adjuster 17ac carries out monitoring and adjustment of the offset voltage every specified time, while the pointing device is in operation.

The X direction A/D converter 17b converts the output from the first amplifier 13a into a digital signal, and the Y direction A/D converter 17c converts the output from the second amplifier 13b into a digital signal. The arithmetic logic unit 17d carries out various operations that are essential for the operation of the pointing device, such as calculation of the reference voltage for determining the cursor speed, or calculating an error between a specified offset voltage and an actual offset voltage, etc. The amplifier output memory 17f stores offset voltages Fx (V) and Fy (V), which have been output from the first amplifier 13a and second amplifier 13b and converted into digital signals by the respective A/D converters 17b, 17c. The offset voltage control signal memory 17g stores a control signal Xoff for making Fx (V) have a specified offset voltage of 2 (V), and a control signal Yoff for making Fy (V) have a specified offset voltage of 2 (V), when an external force causing the cursor to move is not being applied to the operation section 11ae and the control section 17a outputs an offset voltage control signal to the reference voltage generating section 15.

Figure 7:
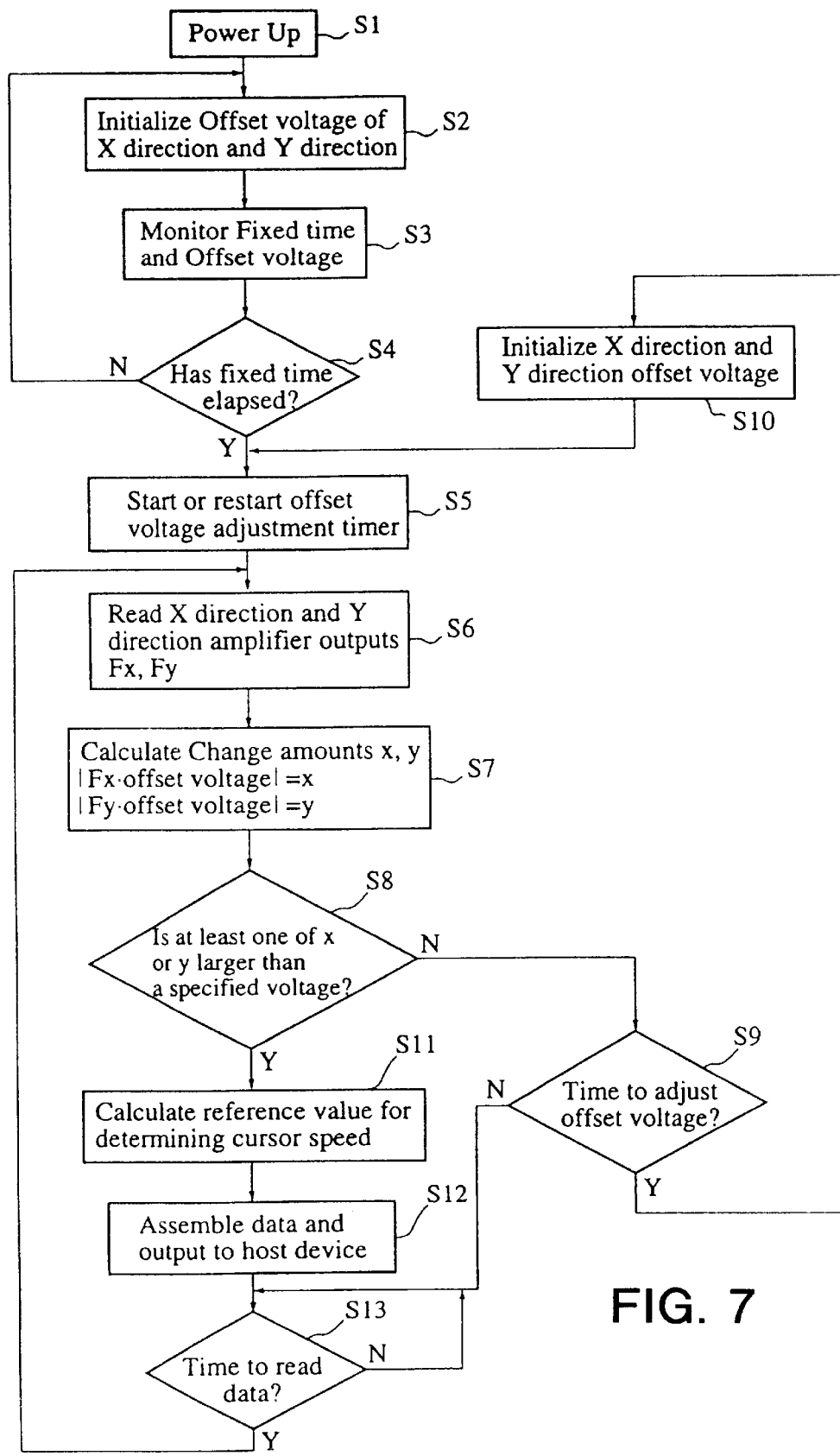
FIG. 7 is a flowchart showing the operation of calculating the speed of movement of the cursor of the pointing device.
Figure 8:
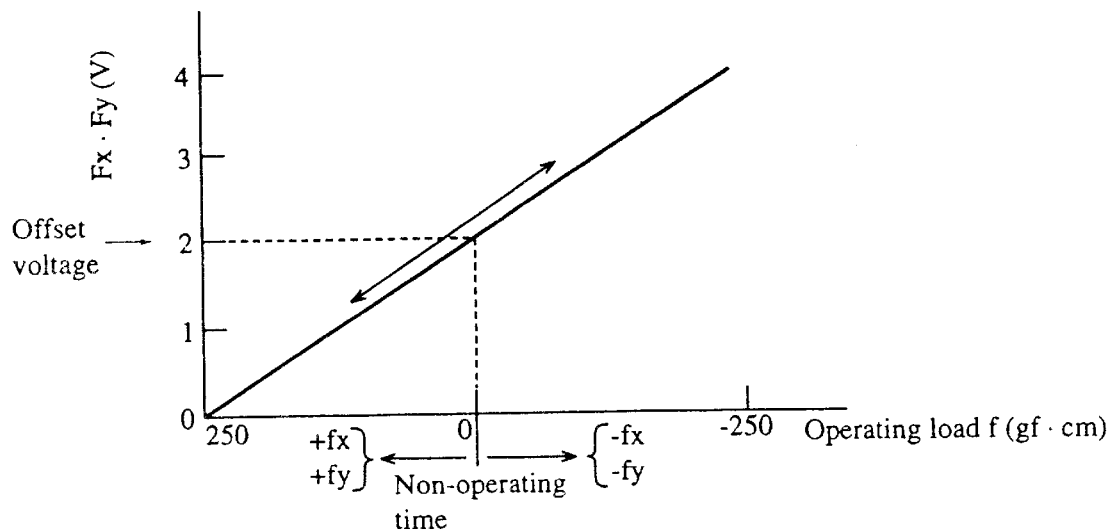
FIG. 8 is a graph showing the relationship between external force and amplifier output.
Figure 9:
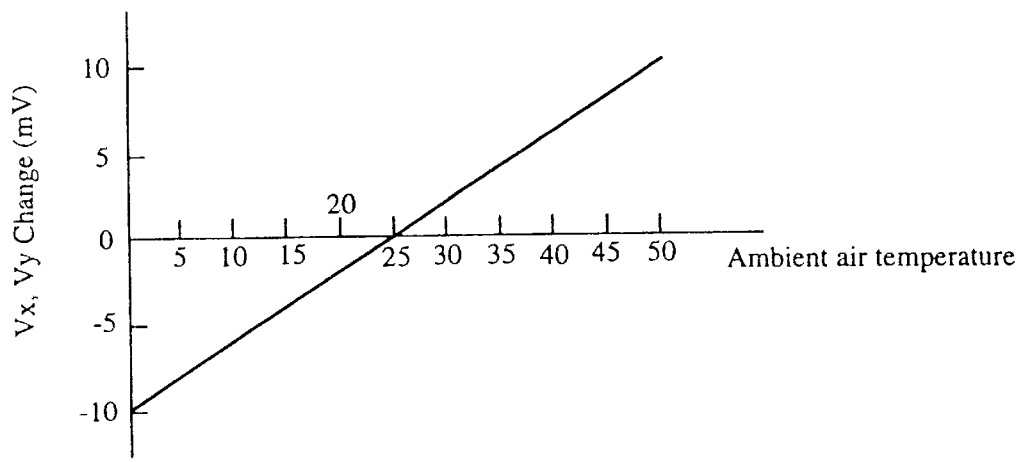
FIG. 9 is a graph showing temperature characteristics of the sensor.
Figure 10:
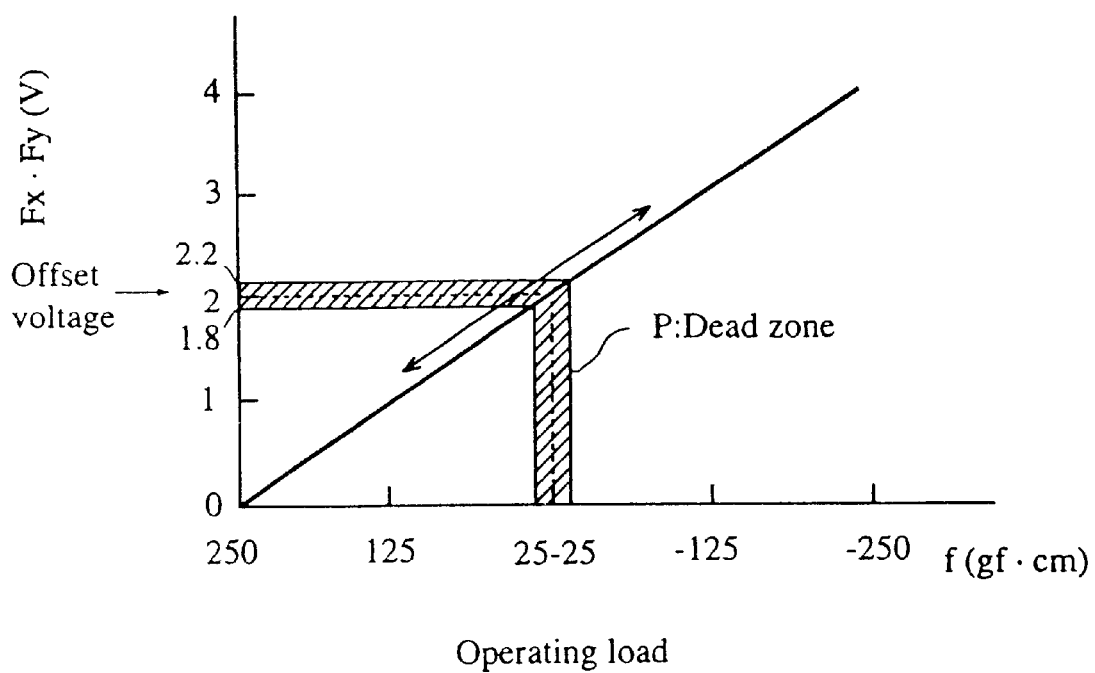
FIG. 10 is a graph showing a dead zone of the pointing device.
Figure 11:
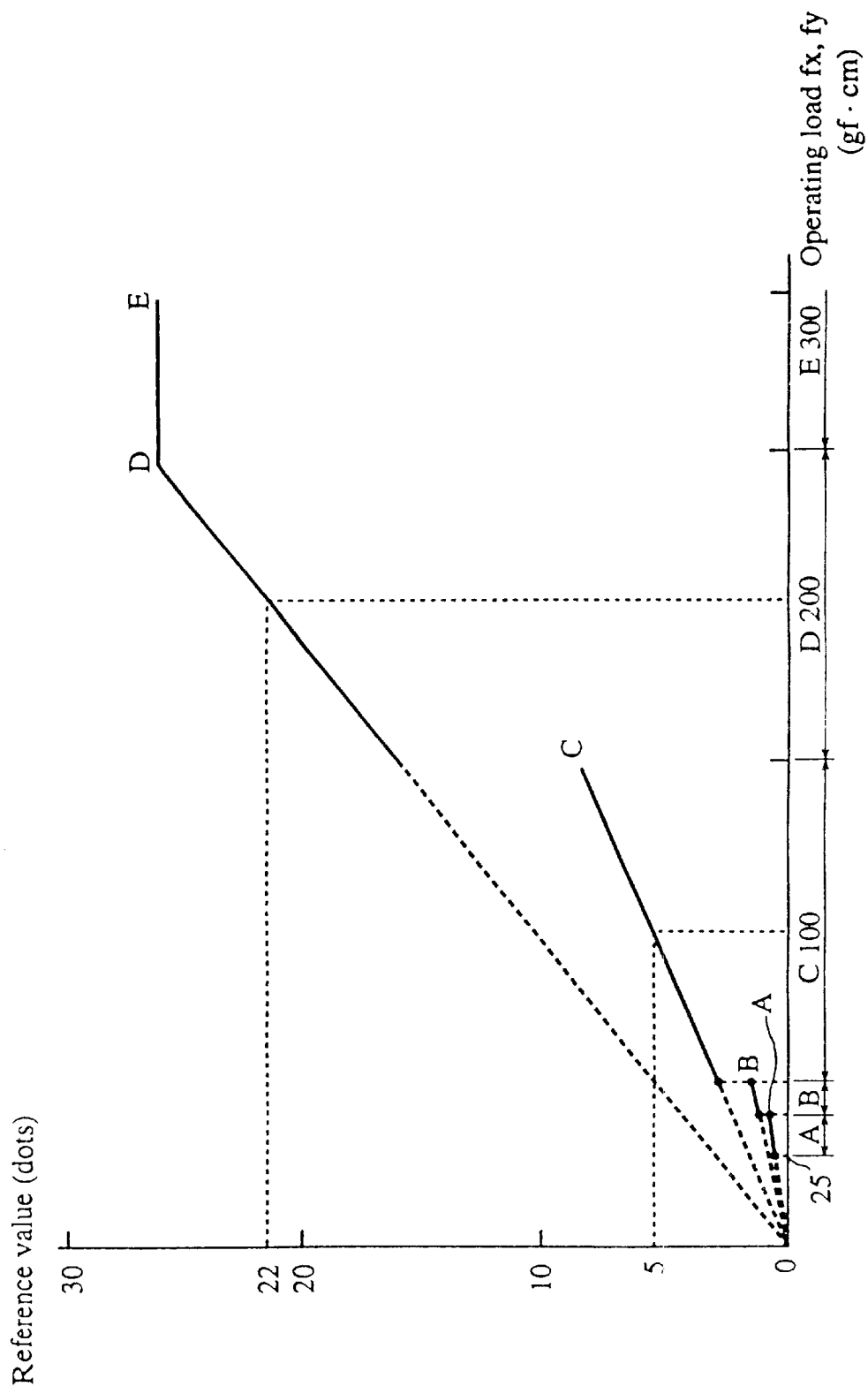
FIG. 11 is a graph showing the relationship between external force and a reference voltage (or) determining the cursor speed.
Figure 12:
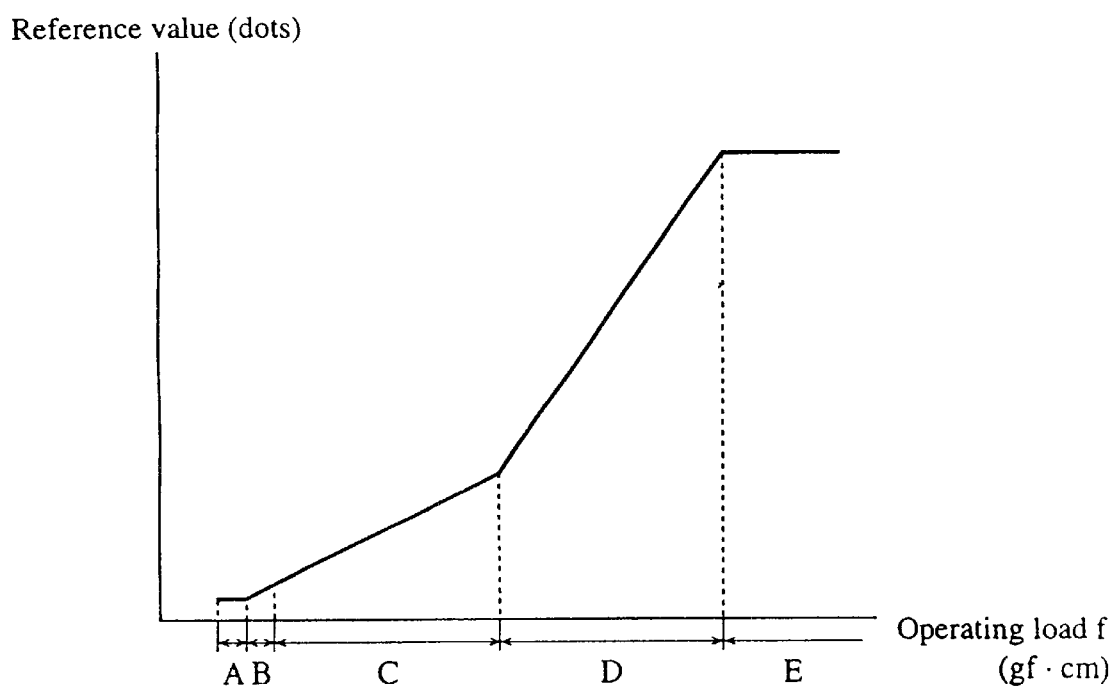
FIG. 12 is a graph showing the relationship between external force and a reference voltage (or) determining the cursor speed for another example.

The operation of calculating the cursor speed utilizing the above-described pointing device will now be explained with reference to the drawings. FIG. 7 is a flowchart showing the operation of calculating the cursor speed, FIG. 8 is a graph showing the relationship between external force and amplifier output, FIG. 9 is a graph showing temperature characteristics of the sensor, FIG. 10 is a graph showing a dead zone of the pointing device, FIG. 11 is a graph showing the relationship between external force and a reference voltage for determining the cursor speed, and FIG. 12 is a graph showing the relationship between external force and a reference voltage for determining the cursor speed for a modified example.

In FIG. 7, a power supply voltage is supplied to the microcomputer 17 and the pointing device is started up (step S1). The control section 17a then outputs an offset control signal for controlling the offset voltage of the first amplifier 13a, to be used by the reference voltage generating section 15, from I/O port P3. Also, the I/O port P1, to which the output Fx (V) of the first amplifier 13a having the offset voltage is input, is read, and this operation is carried out until Fx (V) becomes 2 (V). When the output of the first amplifier 13a becomes 2 (V), the offset voltage control signal Xoff at that time is stored in the offset voltage control signal memory 17g.

Similarly, an offset voltage control signal for controlling the offset voltage of the second amplifier 13b, and used by the reference voltage generating section 15, is output from I/O port P3. The I/O port P2, to which output Fy (V) of the second amplifier 13b having the offset voltage is input, is read, and this operation is carried out until Fy (V) becomes 2 (V). When the output of the second amplifier 13b becomes 2 (V), the offset voltage control signal Y off at that time is stored in the offset voltage control signal memory 17g. The initial offset voltages 2 (V) for each of the amplifiers 13a and 13b initialized using this process are written into the amplifier output memory 17f (step 2).

Next, from start-up of the pointing device until a specified time has elapsed (50 ms in this embodiment), the initial offset voltage stabilizer 17ab consecutively and alternately reads the respective outputs from the first amplifier 13a and the second amplifier 13b, and monitors them to see whether or not they have changed from 2 (V). This monitoring process is carried out by comparing the read outputs Fx (V) and Fy (V) with the initial offset voltage 2 (V). The control section 17a determines whether or not the difference between the read outputs, Fx (V) and Fy (V), and the initial offset voltage is not outside a prescribed permitted range since start-up of the pointing device 1 until 50 ms has elapsed (step 4). In the event that either of the read outputs Fx (V) or Fy (V) moves out of the permitted range before 50 ms has elapsed, the control section 17a establishes the initial offset again (step 2), because some external force or other had been applied to the sensor 11 at the time of establishing the offset voltage.

If neither of the outputs Fx (V) or Fy (V) moves out of the permitted range from the time of start-up of the pointing device 1 until 50 ms has elapsed, the control section 17a determines that no external force was applied to the sensor 11 during offset establishment and that the initial offsets have been established normally, and starts an offset voltage adjustment timer housed inside the offset voltage adjuster 17ac (step 5). In this way, by setting up the initial offset voltage stabilizer 17ab, even if an inappropriate offset voltage is established as a reference due to some external force or other being applied to the sensor 11 during offset voltage establishment the suitability of the offsets is monitored and adjusted. So, if a load which an operator applies to the sensor 11 so as to move the cursor at a slow speed is extremely weak, the cursor is moved at a low speed which is touch sensitive to that load.

The pointing device now moves from the above-described initial offset voltage establishing mode to a mode for periodically carrying out a series of processes of taking in the outputs of the amplifier section 13 and calculating a reference voltage for determining a cursor speed. First of all, after the Xoff value contained in the offset voltage control signal memory 17g is output from the I/O port P3 to the reference voltage generator 15, the control section 17a reads out the output Fx (V) of the first amplifier 13a via I/O port P1, and stores it in the amplifier output memory 17f. Also, after the Yoff value contained in the offset voltage control signal memory 17g is output from the I/O port P3 to the reference voltage generator 15, the control section 17a reads out the output Fy (V) of the second amplifier 13b via I/O port P2, and stores it in the amplifier output memory 17f. The control section 17a reads the outputs Fx (V) and Fy (V) from the amplifier section 13 in this way (step 6).

The way in which Fx (V) and Fy (V) output from each of the amplifiers 13a and 13b vary in response to the size of the external force applied to the sensor 11 by the operator will be described with reference to drawings and equations. As shown in FIG. 8, the respective outputs ±Fx (V) and ±Fy (V) of the amplifiers 13a and 13b change in a range of ±2 (V) for an operating load applied to the operation section 11ae of the sensor 11 of ±250 gf·cm, with an offset voltage of 2 (V) being the central point. The outputs ±Fx (V) and ±Fy (V) of the amplifiers 13a and 13b are defined in the equations below with respect to the outputs Vx (V) and Vy (V) from the sensor 11. G in the equations is the gain of the amplifiers, and in this embodiment has a value of 66.

$$\pm Fx(V) = (Vx\ (V) - \text{reference voltage}) \times G \quad (1)$$

$$\pm Fy(V) = (Vy\ (V) - \text{reference voltage}) \times G \quad (2)$$

The sensitivity of the external force detection section 11a, namely the relationship between the operating load applied to the operation section 11ae, and the voltage Vx (V) or Vy (V) output from the signal converter 11b as a result of this load, is 0.12 mV/gf·cm. Accordingly, if the X direction moment force of the operating load applied by the operator is defined as fx(gf·cm) and the Y direction moment force is defined as fy(gf·cm), the voltages Vx (V) and Vy (V) output from the signal converter 11b of the sensor 11 are represented by the following equations:

$$Vx(V) = 0.12 \times 10^{-3} \times fx(gf \cdot cm) \quad (3)$$

$$Vy(V) = 0.12 \times 10^{-3} \times fy(gf \cdot cm) \quad (4)$$

The change in the output Fx (V) from the first amplifier 13a in response to the size of the operating load is derived from equations (1) and (3), while the change in the output Fy (V) from the second amplifier 13b in response to the size of the operating load is derived from equations (2) and (4).

The amount of change x in the output from the first amplifier 13a and the amount of change y in the output from the second amplifier 13b in response to the load applied to the operation section 11ae are respectively represented by the following equations:

$$x = Fx(V) - \text{offset voltage} \quad (5)$$

$$y = Fy(V) - \text{offset voltage} \quad (6)$$

The arithmetic logic unit 17d in the control section 17a calculates the amount of change x and the amount of change y according to equations (5) and (6), using the offset voltage, the output Fx from the first amplifier 13a and the output Fy from the second amplifier 13b (step 7).

Next, it is determined whether or not the amounts of change x and y have been caused by a load applied by an operator to the sensor 11, by determining whether or not at least one of the amount of change x or the amount of change y is larger than a specified voltage (step 8). That is, if at least one of the amount of change x or the amount of change y is larger than a specified voltage, it is determined that the changes are a result of an operator load, but if they are both below the specified voltage it is determined that the changes are not the result of an operator load.

The outputs Vx (V) and Vy (V) from the sensor 11 change as a result of variations in ambient air temperature, which in turn causes the outputs Fx (V) and Fy (V) from the amplifier section 13 to change, and that specified voltage is established at a value which includes these change amounts. By thus establishing the value, when there is a change in the outputs Fx (V) and Fy (V) caused by variations in ambient air temperature, these changes will not be erroneously determined as changes in output caused by an operator load. The procedure for establishing the specified voltage will be explained below. The sensor 11 of this embodiment has a temperature characteristic, of output Vx (V) or Vy (V) to changes in ambient air temperature, of 0.4(mV/° C.), as shown in FIG. 9. If a maximum change in ambient temperature of ±5° C. is considered, the change in output Fx (V) of the amplifier section 13 becomes $$|Fx(V)| = |0.4(mV/^\circ C.) \times 66(\text{gain}) \times 5(^\circ C.)| = 0.132(V). \quad (7)$$

The change in the output Fy (V) of the amplifier section 13 also becomes 0.132 (V), from the same expression. Therefore, with a range of offset voltage change of ±0.2 (V), as represented by the dead zone P in FIG. 10, if the outputs from the amplifier section 13 are within the range 1.8(V)<Fx (V)<2(V) and 1.8 V<Fy (V)<2.2(V), namely, if the operating loads are within the range −25(gf·cm)<fx(gf·cm)<+25 (gf·cm) and/25(gf·cm)<fy(gf·cm)<+25(gf·cm), this will not be determined as being a load applied by an operator.

When both of the change amounts x or y are less than the specified voltage, that is the amplifier outputs Fx (V) or Fy (V) are within the dead zone P, an external force for moving the cursor is not being applied to the operation section 11ae, and it is determined from the offset voltage adjustment timer whether or not it is time to adjust the offset voltage (step 9). When it is time to adjust the offset voltage, the offset is re-established using the same processing to that carried out in step 2 (step 10). By providing the offset voltage adjuster 17ac, even if the outputs Vx (V) and Vy (V) of the sensor 11 vary due to large changes in the ambient air temperature, the offset voltage is re-established as occasion demands by assuming this change in ambient air temperature, which means that the ratio of operating load to cursor speed can always be uniform in the X direction and the Y direction. Also, when no external load is being applied to the sensor 11, the amount of change x and y of the outputs from the amplifier section 13 inevitably fall below the specified voltage for the offset voltage, and the cursor is prevented from moving in a non-operating state.

Different effects can also be achieved, as described below. Namely, in the sensor 11, the electrostatic capacities C1 and C2, or the electrostatic capacities C2 and C4 do not have the same capacitance when the operation section 11ae is not being operated, due to such factors as warp of the substrate 11aa and the position sensitive sleeve 11ac, and differences in circuit capacitance and floating capacitance of the wiring. In order to make them the same, adjustment of the signal converter 11b must be carried out by hand, and the manufacturing process is therefore made more complicated. As offset voltage adjuster 17ac carries out adjustment for a suitable offset, it is neither necessary for the electrostatic capacity C1 to be the same as C3 nor C2 to be the same as C4, it is possible to omit the manual operation of adjusting the signal conversion section 11b and the manufacturing process is improved.

When at least one of the change amount x or the change amount y is larger than the specified voltage, in other words, when one of the outputs Fx (V) or Fy (V) is outside the dead zone P, an operating load has been applied by the operator and the control section 17a calculates a reference voltage for determining the cursor speed (step 11). The reference voltage is calculated based on the product of a coefficient previously determined for each of a number of divided classes in response to the size of the outputs Fx (v), Fy (V) from the amplifier section 13, and the change amount x or the change amount y, etc. The control section 17a first of all derives the X direction and Y direction moment forces fx (gf·cm) and fy (gf·cm) in the operator load giving rise to the change amounts x and y, using the following equations.

$$fx(gf \cdot cm) = x/(0.12 \times 10^{-3} \times G) \qquad (8)$$

$$fy(gf \cdot cm) = y/(0.12 \times 10^{-3} \times G) \qquad (9)$$

It is then determined, from the moment forces derived from these equations, in which one of a number of classes A–E, divided according to the size of the operating load as shown in FIG. 11, the change amount x or change amount y is included in. If the size of fx (gf·cm) and fy (gf·cm) belong to different classes within classes A–E, the class to which they belong is determined as that of the larger value. By determining the class to which fx (gf·cm) and fy (gf·cm) belong as that of the larger value, the references for coordinate conversion in the X direction and the Y direction become the same when carrying out the calculation to derive the reference voltage determining the cursor speed, which makes it possible to move the cursor in a straight line.

The coefficient used for calculating the reference voltage for determining the cursor speed is different for each of the classes A–E. In this embodiment, the coefficient is set to $\frac{1}{3}$ for class A, to $\frac{1}{16}$ for class B, $\frac{1}{8}$ for class C, and $\frac{1}{4}$ for class D. In class E, a coefficient is used which makes the number of outputs per unit time always a constant value K, that is, a coefficient which in the X direction is (K: change amount x), and in the Y direction is (K: change amount y). The reference voltage in this embodiment is determined so that it changes discontinuously at the boundary of each class, but as shown in FIG. 12, it is also possible to set the coefficient used for calculating the reference voltage for each class so that the locus of the reference voltage for each class becomes a line graph.

The control section 17a assembles the reference voltage, calculated based on such factors as the above mentioned coefficient and the change amounts x, y, in a data format which matches a host device 20 interface and outputs it to the host device 20 (step 12). In this embodiment, the rate M of moving the cursor on the display screen (dots/sec) is derived from the following equation:

$$M = n \text{ (dots)} \times \text{read frequency from host device} \qquad (10)$$

and the calculated reference voltage is equivalent to this n. The host device accesses the pointing device every 25 ms, so the frequency of reads from the host device is 1/25 ms=40 times in one second. The control section 17a determines whether or not it is time to carry out this once every 25 ms read (step 13), and if it is time, reading of the amplifier outputs Fx (V) and Fy (V) in step 6 is carried out again.

As has been described above, if an operator applies a large load to the operation section 11ae, the cursor on the display screen is moved at a low speed determined using a reference voltage calculated based on this large load. Similarly, if a small load is applied, the cursor is moved at a low speed determined using a reference voltage calculated based on the small load. For example, if the operator applies a load of 100 gf·cm to the operation section 11ae, the reference voltage becomes 5 dots, and the cursor is moved on the display screen at a rate of $$5\text{(dots)} \times 40\text{(times/sec)} = 200\text{(dots per second)}. \qquad (11)$$

Further, if the operator applies a load of 200 gf·cm to the operation section 11ae, the reference voltage becomes 22 dots, and the cursor is moved on the display screen at a rate of $$22\text{(dots)} \times 40\text{(times/sec)} = 880\text{(dots per second)}. \qquad (12)$$

What is claimed is:

1. A pointing device comprising:

a sensor for detecting respective components of an applied external force in the X direction and Y direction, converting said components to signals and outputting the signals;

an amplifier section for respectively amplifying outputs from the sensor;

a reference voltage generator for outputting to the amplifier section a reference voltage for adjusting an offset voltage output from the amplifier section when no external force moving the cursor is applied to the sensor; and a microcomputer for modifying a coefficient, used when a reference voltage for determining a cursor speed is calculated, in response to the size of an output from the amplifier section.

2. The pointing device of claim 1, further comprising:

an operation section;

a first electrode fixed to the operation section; and a plurality of second electrodes respectively provided for an X direction and a Y direction at positions opposite to the first electrode, wherein an electrostatic capacity between the first electrode and second electrodes, changing as a result of an operation in the operation section, is detected as external force components in the X direction and the Y direction.

3. The pointing device of claim 1, wherein the microcomputer calculates change amounts of the amplifier outputs and calculates moment forces for respective external forces in an X direction and a Y direction from these change amounts, and selects a coefficient for a class equivalent to the calculated moment force from classes divided in advance for each moment force.

4. The pointing device of claim 1, further comprising initial offset voltage stabilizer for adjusting an offset voltage of each direction after start-up of the pointing device, and carrying out monitoring and adjustment of the offset voltages for a fixed time from start-up.

5. The pointing device of claim 1, further comprising offset voltage adjuster for carrying out monitoring and adjustment of the offset voltage every fixed time while the pointing device is in operation.

6. A personal computer utilizing a pointing device, the pointing device comprising:

a sensor for detecting respective components of an applied external force in the X direction and Y direction, converting to the components signals and outputting the signals;

an amplifier section for respectively amplifying outputs from the sensor;

a reference voltage generator, for outputting to the amplifier section a reference voltage for adjusting an offset voltage output from the amplifier section when no external force moving the cursor is applied to the sensor; and a microcomputer for modifying a coefficient, used when a reference voltage for determining a cursor speed is calculated, in response to the size of an output from the amplifier section.

7. A method for calculating a speed of a pointing device cursor, comprising the steps of, (a) initializing an offset voltage, (b) monitoring and adjusting the offset voltage every fixed time, (c) reading outputs from an amplifier, (d) calculating amplifier output change amounts, (e) determining whether or not the change amounts are larger than a specified voltage, (f) determining whether or not it is time to adjust the offset voltage, (g) reinitializing the offset voltage at the time of adjusting the offset voltage, if the change amounts are less than the specified voltage, (h) calculating a reference voltage for determining a cursor speed from the amplifier output change amounts, and (i) assembling data and outputting the data to a host device.

8. The pointing device of claim 4, further comprising offset voltage adjuster for carrying out monitoring and adjustment of the offset voltage every fixed time while the pointing device is in operation.

* * * * *